United States Patent
Nawa

(10) Patent No.: US 6,704,169 B2
(45) Date of Patent: Mar. 9, 2004

(54) ACTUATOR ASSEMBLY

(75) Inventor: Ikuichiro Nawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 148 days.

(21) Appl. No.: 10/039,895

(22) Filed: Oct. 24, 2001

(65) Prior Publication Data

US 2002/0060884 A1 May 23, 2002

(30) Foreign Application Priority Data

Oct. 25, 2000 (JP) .................................. 2000-325709

(51) Int. Cl.[7] ................................................. G11B 5/55
(52) U.S. Cl. .................................................. 360/261.3
(58) Field of Search ........................... 360/261.1, 261.3, 360/264.2, 266.3

(56) References Cited

U.S. PATENT DOCUMENTS

| | | | |
|---|---|---|---|
| 5,163,836 A | * 11/1992 | Young et al. | 439/67 |
| 5,414,585 A | 5/1995 | Saliba | |
| 5,434,732 A | * 7/1995 | Schwarz et al. | 360/291 |
| 5,615,068 A | * 3/1997 | Matsuda et al. | 360/264.2 |
| 5,631,788 A | * 5/1997 | Richards | 360/264.2 |
| 5,742,484 A | * 4/1998 | Gillette et al. | 361/789 |
| 5,748,410 A | * 5/1998 | Briggs et al. | 360/261.1 |
| 5,793,574 A | 8/1998 | Cranson et al. | |
| 5,818,667 A | * 10/1998 | Larson | 360/264.2 |
| 5,857,634 A | 1/1999 | Hertrich | |
| 5,862,014 A | 1/1999 | Nute | |
| 6,058,098 A | * 5/2000 | Kato | 369/219 |
| 6,078,483 A | * 6/2000 | Anderson | 360/261.1 |
| 6,241,171 B1 | 6/2001 | Gaboury | |
| 6,388,836 B2 | * 5/2002 | Anderson et al. | 360/128 |
| 6,404,598 B1 | * 6/2002 | Nayak et al. | 360/291 |

FOREIGN PATENT DOCUMENTS

| | | |
|---|---|---|
| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

* cited by examiner

Primary Examiner—Robert S. Tupper
(74) Attorney, Agent, or Firm—Frishauf, Holtz, Goodman & Chick, P.C.

(57) ABSTRACT

A head lift mounting a head assembly and having a through hole allowing a lead screw to extend therethrough, comprises a cylindrical portion having a hollow opening formed in the center thereof. A pair of flexible print circuits are arranged in a manner such that the cylindrical portion of the head lift is wound by the flexible print circuits. An actuator assembly is kept vertical on a chassis by virtue of a bearing holder, while the pair of flexible print circuits are extending out through one side of the bearing holder.

2 Claims, 10 Drawing Sheets

ACTUATOR ASSEMBLY

BACKGROUND OF THE INVENTION

This invention relates to a linear tape storage system for storing linear tapes represented by DLT (Digital Linear Tape) and LTO (Linear Tape Open) and, in particular, to a magnetic tape head actuator assembly for use in such a linear tape storage system.

A linear tape storage system of the type has been developed as a backup for a computer system. A variety of linear tape storage systems have heretofore been proposed. For example, U.S. Pat. No. 5,862,014 discloses a digital linear tape drive which is for use in driving a magnetic tape such as DLT (Digital Linear Tape).

A digital linear tape drive (hereinafter may simply be referred to as "driving device", "tape drive", or "drive") is adapted to receive a tape cartridge (hereinafter may simply be referred to as "cartridge") having a single reel (supply reel). The digital linear tape drive contains a take-up reel which is installed in a manner such that once a tape cartridge is inserted into the tape drive, a magnetic tape will be fed out from the tape cartridge. Then, the magnetic tape will be wound around the take-up reel by way of a head guide assembly (HGA). Here, the head guide assembly serves to guide a magnetic tape (hereinafter may simply be referred to as "tape") fed out from the tape cartridge. A magnetic head operates to perform data exchange between the magnetic head and the magnetic tape. In detail, the head guide assembly comprises an aluminum plate having a boomerang shape and also comprises six large guide rollers which comprise bearings.

The head guide assembly is also called a tape guide assembly, which is disclosed, for example, in U.S. Pat. No. 5,414,585. On the other hand, an example of guide rollers has been disclosed in Japanese Unexamined Patent Publication No. 2000-100025 (JP 2000-100025 A).

In general, a tape drive contains a generally rectangular housing which has a common base, as disclosed in U.S. Pat. No. 5,793,574. In detail, the common base mounts two spindle motors (reel motors). The first spindle motor has a spool (take-up reel) permanently installed on the base. This spool is dimensioned so as to receive a magnetic tape streaming at a relatively high speed. The second spindle motor (reel motor) is adapted to receive a detachable tape cartridge. Such a detachable tape cartridge can be inserted manually or automatically into the drive through a slot formed in the housing of the drive. Once the tape cartridge is inserted through the slot into the drive, the tape cartridge is engaged with the second spindle motor (reel motor). Prior to the rotation of the first and second spindle motors (reel motors), the tape cartridge will be connected with the permanently installed spool (take-up reel), by virtue of a mechanical buckling structure. A plurality of rollers (guide rollers) are positioned between the tape cartridge and the permanently installed spool and are rotated to guide the magnetic tape when it is moved back and forth at a relatively high speed between the tape cartridge and the permanently installed spool.

However, the digital linear tape drive having the above-described structure is required to have a tape pulling device which enables the take-up reel to pull the magnetic tape from the supply reel. Such a tape pulling device is disclosed, for example, in International Publication No. WO86/07471. According to this International Publication, take-up leader means (first tape leader) is connected with the take-up reel while supply tape leader means (second tape leader) is fixed with the tape on the supply reel. Further, the first tape leader has a tab on one end thereof while the second tape leader has a locking hole, thereby allowing the tab to be engaged into the locking hole.

Further, it is also necessary to have a structure which can connect a first tape leader to a second tape leader. Such connection structure is disclosed in International Publication No. WO86/07295.

Further, Japanese Unexamined Patent Publication No. 2000-100116 (JP 2000-100116 A) discloses a "leader tape retaining structure" which is capable of retaining an end portion of a leader tape to a tape end retainer of the tape cartridge, without having to provide a thin leaf member protruding outwardly from one side of the leader tape (a second tape leader).

Moreover, U.S. Pat. No. 5,857,634 discloses a locking system which is useful for preventing an undesired rotation of a take-up reel of a tape drive under a condition when a tape cartridge has not been inserted into the tape drive.

On the other hand, Japanese Unexamined Patent Publication No. 2000-149491 (JP 2000-141491 A) discloses an example of a tape cartridge suitable for being inserted into a digital linear tape drive.

In addition, U.S. Pat. No. 6,241,171 discloses a tape drive which does not require the use of a buckling structure or a take-up leader, but enables a tape leader to be pressed forward by a take-up reel so that it moves from a tape cartridge.

The above tape drive further has a magnetic tape head actuator assembly. Such a magnetic tape head actuator assembly is located on a tape path defined by a plurality of rollers and positioned between a take-up spool and a tape cartridge. During the operation of the tape drive, the magnetic tape streams back and forth between the take-up spool and the tape cartridge. While streaming along the tape path defined as mentioned above, the magnetic tape is allowed to get extremely close to the magnetic head actuator assembly. One example of such magnetic head actuator assembly is disclosed in the above-mentioned U.S. Pat. No. 5,793,574.

FIG. 1 is used to illustrate a conventional tape drive containing a conventional magnetic tape head actuator assembly. In fact, FIG. 1 is a plan view showing a conventional tape drive with its top cover taken away for clear illustration.

As shown in the drawing, a tape drive 10' is adapted to receive a tape cartridge (not shown) and contains a take-up reel 11 in its internal space. In practice, such a take-up reel 11 can also be called a spool. Specifically, the tape drive 10' comprises a housing (chassis) 12' which has a generally parallelepiped shape and a common base 12'a. Two spindle motors (reel motors) 13' and 14 are mounted on the common base 12'a. In particular, the first spindle motor 13' has a spool (take-up reel) 11 permanently installed on the base. The spool 11 has a relatively large size so that it can receive one roll of magnetic tape (not shown) streaming at a relatively high speed. The second spindle motor (reel motor) 14 is provided to receive a detachable tape cartridge. Such a detachable tape cartridge can be inserted automatically or manually into the drive 10' along a direction represented by an arrow A in the drawing, passing through a slot 12'b formed in the housing 12' of the drive 10'.

Once the tape cartridge is inserted through the slot 12'b into the tape drive, the tape cartridge will be engaged with the second spindle motor 14. In this way, prior to the rotation of the first and second spindle motors (reel motors) 13' and 14, the tape cartridge will be connected with the spool (take-up reel) 11 installed in position by virtue of a mechanical buckling structure. A plurality of rollers (guide rollers) 15 are provided between the tape cartridge and the permanently installed spool 11, so as to guide a magnetic tape when the magnetic tape moves back and forth at a high speed between the tape cartridge and the spool 11.

The housing (chassis) 12' is formed by an aluminum die-cast which is of course non-magnetic material. Accordingly, in order to stop a magnetism leakage from a magnet (not shown) contained in the second spindle motor 14, the second spindle motor 14 is covered by a plate 16 formed by a ferric magnetic material.

In fact, the tape drive 10' further contains a magnetic tape head actuator assembly (hereinafter, simply referred to as actuator assembly) 20'. Such magnetic tape head actuator assembly 20' is disposed between the take-up spool 11 and the tape cartridge, along a tape path (not shown) defined by the plurality of rollers 15. In operation, the magnetic tape will stream back and forth between the winding spool 11 and the tape cartridge. Subsequently, while streaming along the predetermined tape path, the magnetic tape gets close to the magnetic tape head actuator assembly 20'.

Next, FIGS. 2 to 5 will be used to explain a conventional magnetic tape head actuator assembly 20'. In detail, FIG. 2 is a perspective view showing an outer appearance of a conventional magnetic tape head actuator assembly 20'. FIG. 3 is an exploded perspective view in which the magnetic tape head actuator assembly 20' shown in FIG. 2 has been separated into a tape head assembly 30 and a head sending mechanism 40'. FIG. 4 is a perspective view partially showing the magnetic tape head actuator assembly 20' shown in FIG. 2, as well as a bearing holder 50'. FIG. 5 is an enlarged plan view illustrating the magnetic tape head actuator assembly 20' shown in FIG. 1.

As shown in FIG. 3, the magnetic tape head actuator assembly 20' comprises the tape head assembly (hereinafter, simply referred to as head assembly) 30 and the head sending mechanism 40'. The tape head assembly 30 has a magnetic head (head) 31 arranged in the vertical direction, and a head holder 32 holding the magnetic head 31, as well as a pair of flexible print circuits (FPC) 33 which are provided for effecting an electric connection between the magnetic head 31 and an external circuit (not shown).

The head holder 32 comprises a head holding portion 321 for holding the magnetic head 31, a pair of mutually opposed flange portions 322 each protruding from an upper end of the head holding portion 321 and extending in a direction perpendicular to the head holding portion 321. Each flange portion 322 has a hole 322a for receiving a screw 34 which is allowed to engage with the flange portion 322 by virtue of the hole 322a. In this manner, the tape head assembly 30 and the head sending mechanism 40' (which will be described in more detail later in the present specification) may be installed in position by means of the flange portions 322. Further, the head holding portion 321 has an opening 321a formed in substantially the center thereof. By way of the opening 321a, one end of each of the flexible print circuits (FPC) 33 is allowed to be electrically connected with the magnetic head 31.

On the other hand, the head sending mechanism 40' comprises 1) a lead screw (which is in fact a shaft formed with a plurality of screw threads) 41' having a rotational center axis O and a plurality of screw threads 41'a, 2) a head lift 42' having a generally square-shaped opening 42'a, capable of holding and at the same time moving the tape head assembly 30, 3) a split nut (hereinafter, simply referred to as "nut") 43' located within the opening 42'a of the head lift 42' so as to be fixed within the head lift 42', said split nut having a plurality of screw grooves engageable with the screw threads 41'a of the lead screw 41', 4) a lead screw gear 44' attached to the lower end of the lead screw 41' and capable of rotating the lead screw 41' about the rotational center axis O by virtue of other driving means.

Here, the split nut 43' is provided to move the head lift 42' (upwardly or downwardly) in a direction along the rotational center axis O, corresponding to the rotation of the lead screw 41' about the rotational center axis O.

Further, the split nut 43' has a pair of splits (slits) 432' (but only one is shown in the drawing) orientated in a direction parallel to the rotational center axis O and separated from each other by 180 degrees in the circumferential direction. Moreover, the split nut 43' has a pair of projections 433' each protruding outwardly from the upper end of the nut. The pair of projections 433' are allowed to engage into nut holding grooves formed on a pair of side walls of the head lift 42'. In this way, the screw grooves of the split nut 43' are engageable with the screw threads 41'a of the lead screw 41', thereby making it possible to move the head lift 42' upwardly or downwardly along the rotational center axis O of the lead screw 41'.

In addition, the split nut 43' has an annular groove 434' formed on the outer periphery surface of the nut. A doughnut-like spring (circular spring) 48' is engaged in the annular groove 434'. Here, the doughnut-like spring 48' is a special coil spring formed into a doughnut-like configuration. With the use of such a doughnut-like spring 48', an inward compressing force can be applied to the nut 43'. However, in order to alleviate an undesired deformation of the nut 43', such a nut 43' is also formed with an annular space 435' orientated in a direction perpendicular to the rotational center axis O.

Accordingly, when the lead screw 41' of the actuator assembly 20' (the head sending mechanism 40') is rotated in the clockwise direction or the counter clockwise direction, the head lift 42' and the head assembly 30 attached on the head lift will be caused to move in the upward or downward direction along the rotational center axis O, corresponding to the rotation of the lead screw 41'.

However, a combination of the split nut 43' with the doughnut-like spring 48' can serve as a backlash preventing mechanism for preventing a backlash of the actuator assembly 20'. In more detail, for the purpose of preventing a backlash which will possibly occur when the head lift 42' moves corresponding to the rotation of the lead screw 41', the doughnut-like spring 48' is used to cause an elastic deformation of the split nut 43' having a split (slit) 432', thereby inwardly pressing the lead screw 41' by virtue of an inwardly facing radial force.

Further, as shown in FIG. 4, the actuator assembly 20' (the head sending mechanism 40') is kept vertical on the chassis 12' by virtue of the bearing holder 50'. In practice, the bearing holder 50' has a through hole 50'a formed in the central portion thereof, in a manner such that the pair of flexible print circuits (FPC) 33 may be inserted therethrough.

Namely, the pair of flexible print circuits (FPC) 33, as shown in FIG. 3 and FIG. 4, are extending from the magnetic head 31, passing through the opening 321a of the head holding portion 321, further passing through the slots formed between the pair of side walls on one hand and the split nut 43' on the other (all located in the opening 42'a of the head lift 42'), and finally passing through the through hole 50'a formed in the bearing holder 50'.

As described in the above, when a conventional actuator assembly 20' is attached to the tape drive 10', the pair of flexible print circuits (FPC) 33 effecting an input to and an output from the magnetic head 31, are required to extend through the opening 42'a in which the central lead screw 41' of the head lift 42' as well as the split nut 43' have already been disposed.

Further, with regard to the bearing holder 50' capable of vertically holding the head sending mechanism 40' on the chassis 12', it is necessary for the pair of flexible print circuits (FPC) 33 to extend through the central through hole 50'a. As a result, there would occur a problem that it is difficult to attach the actuator assembly 20' to the chassis 12' and another problem that it is also difficult to detach the actuator assembly 20' from the chassis 12'.

Moreover, there would occur a further problem that when the pair of flexible print circuits (FPC) 33 are caused to extend through the holes 42'a as well as the hole 50'a, the pair of flexible print circuits (FPC) 33 are likely to get damaged. In addition, a still further problem is that when a used magnetic head 31 (tape head assembly 30) is to be replaced by a new one, an increased amount of man-hours will be necessary to effect such a maintenance.

SUMMARY OF THE INVENTION

Accordingly, it is an object of this invention to provide an improved actuator assembly which can be easily attached to or detached from a chassis.

It is another object of this invention to provide an improved actuator assembly whose one pair of flexible print circuits (FPC) can be prevented from being damaged when the actuator assembly is attached to or detached from a chassis.

It is a further object of this invention to provide an improved actuator assembly which needs only a decreased amount of man-hours when its magnetic head (tape head assembly) is replaced by a new one.

According to this invention, there is provided an actuator assembly (20) capable of moving a head assembly (30) in a vertically extending axial direction by virtue of a head sending mechanism (40). The head assembly (30) comprises a magnetic head (31) extending in the vertical direction, a head holder (32) for holding the magnetic head (31) and having an opening (321a) formed in substantially the central position thereof, a pair of flexible print circuits (33) extending through the opening (321a) of the head holder (32) and effecting an electrical connection between the magnetic head and an external circuit. The head sending mechanism (40) comprises a lead screw (41) having a plurality of screw threads and having a rotational axis (O) extending in the axial direction thereof, a head lift (42) mounting the head assembly (30) and having a through hole allowing the lead screw (41) to extend therethrough. In particular, the actuator assembly (20) of the invention is characterized in that the head lift (42) comprises a cylindrical portion (421) having a hollow opening (42a) formed in the center thereof, while the pair of flexible print circuits (33) are arranged in a manner such that the cylindrical portion (421) is wound by the flexible print circuits (33).

Further, the actuator assembly (20) of this invention is preferred to be formed in a manner such that the head sending mechanism (40) has a head guide (47) which is attached to the head lift (42) and is formed with a plurality of screw grooves engageable with the lead screw (41), so that the head guide (47) can move the head lift (42) in the vertical direction along the rotational axis, corresponding to the rotation of the lead screw (41). A preferred embodiment of the head sending mechanism (40) also has a backlash preventing mechanism (43, 48) arranged in the hollow opening of the cylindrical portion of the head lift, thereby constantly pressing the head lift in one direction along the rotational center axis of the lead screw. In detail, the backlash preventing mechanism is preferred to be formed by a pre-pressing bush (43) and a compressing coil spring (48). The pre-pressing bush (43) is disposed within the hollow opening of the cylindrical portion of the head lift and has a plurality of screw grooves engageable with the lead screw. The compressing coil spring (48) is also disposed within the hollow opening of the cylindrical portion of the head lift, and interposed between the pre-pressing bush (43) and the head lift (42), thereby constantly providing a pressing force which presses the head lift in the axial direction of the lead screw.

Moreover, the actuator assembly (20) of this invention is also preferred to be kept vertical on a chassis (12) by virtue of a bearing holder (50), while the pair of flexible print circuits are preferred to extend out through one side of the bearing holder (50).

The above reference numerals in the brackets are used only for better understanding of this invention, together providing only one example which should not be utilized to limit the scope of this invention.

DESCRIPTION OF THE PREFERRED EMBODIMENTS

An embodiment of this invention will be described in the following with reference to the accompanying drawings.

Figure 6:
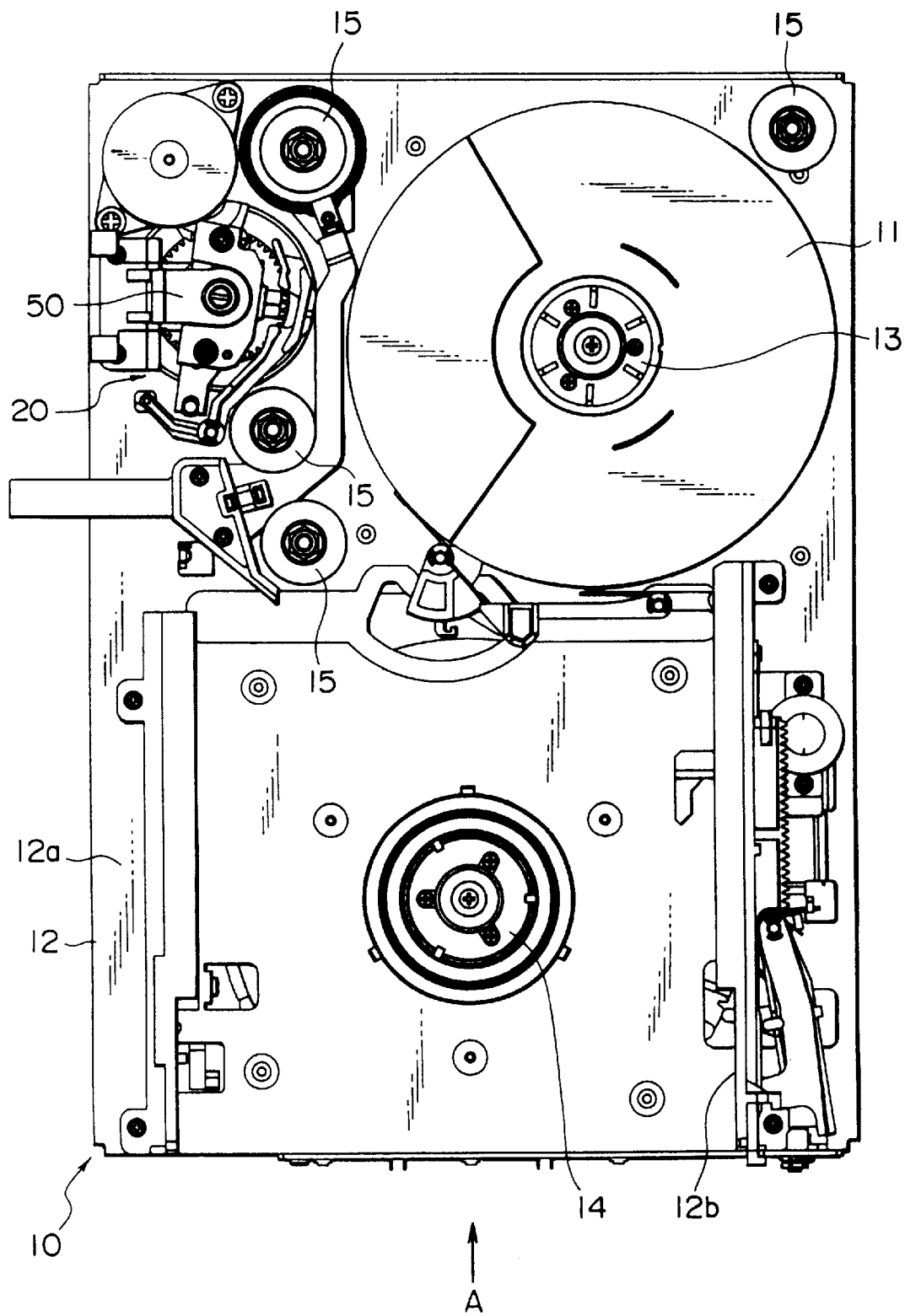
FIG. 6 is a plan view showing a tape drive of this invention containing a magnetic tape head actuator assembly formed according to this invention, with its top cover taken away for clear illustration.

At first, reference is made to FIG. 6 to explain a tape drive of this invention containing a magnetic tape head actuator assembly formed according to this invention. In fact, FIG. 6 is a plan view showing the tape drive, with its top cover taken away for clear illustration.

A tape drive 10 is adapted to receive a tape cartridge (not shown) and contains a take-up reel 11 in its internal space. The take-up reel 11 may also be called a spool. In detail, the tape drive 10 has a housing (chassis) 12 which has a generally rectangular parallelepiped shape and a common base 12a. Two spindle motors (reel motors) 13 and 14 are mounted on the common base 12a. In particular, the first spindle motor 13 has a spool (take-up reel) 11 permanently attached on the base. The spool 11 has a relatively large size so that it can receive one roll of magnetic tape (not shown) streaming at a relatively high speed. The second spindle motor (reel motor) 14 is provided to receive a detachable tape cartridge. Such a detachable tape cartridge can be inserted automatically or manually into the drive 10 along a direction represented by an arrow A in the drawing, passing through a slot 12b formed in the housing 12 of the tape drive 10.

Once the tape cartridge is inserted through the slot 12b, the cartridge will be engaged with the second spindle motor 14. In this way, prior to the rotation of the first and second spindle motors (reel motors) 13 and 14, the tape cartridge will be connected with the spool (take-up reel) 11 installed in position by virtue of a mechanical buckling structure. A plurality of rollers (guide rollers) 15 are provided between the tape cartridge and the permanently installed spool 11, so as to guide a magnetic tape when the magnetic tape moves back and forth at a high speed between the tape cartridge and the permanently installed spool 11. However, the housing (chassis) 12 is formed by a press-treated metal plate consisting of a ferric magnetic material.

In fact, the tape drive 10 further contains a magnetic tape head actuator assembly (hereinafter, simply referred to as actuator assembly) 20. Such magnetic tape head actuator assembly 20 is disposed between the take-up spool 11 and the tape cartridge, along a tape path (not shown) defined by the plurality of rollers 15. During operation of the drive 10, the magnetic tape will stream back and forth between the take-up spool 11 and the tape cartridge. Subsequently, while streaming along the predetermined tape path, the magnetic tape will get close to the magnetic tape head actuator assembly 20.

Figure 7:
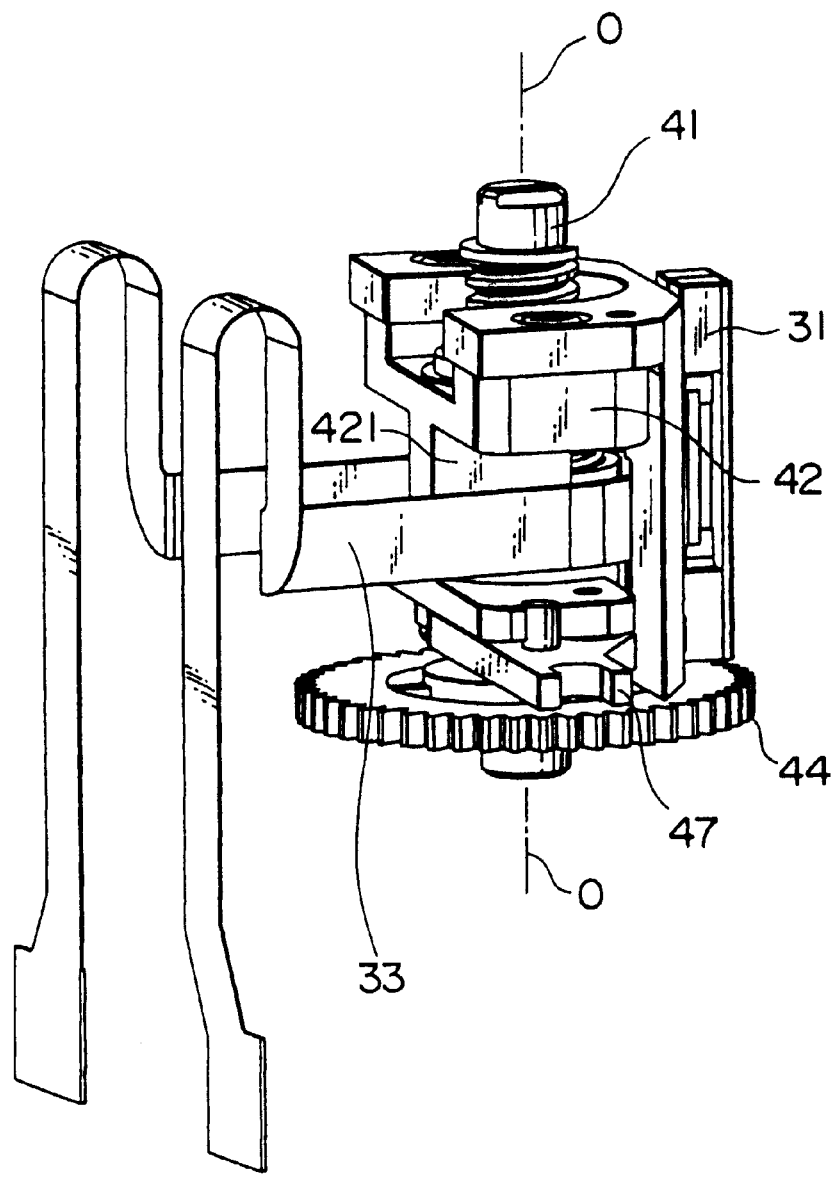
FIG. 7 is a perspective view showing an outer appearance of a magnetic tape head actuator assembly formed according to one embodiment of this invention.
Figure 8:
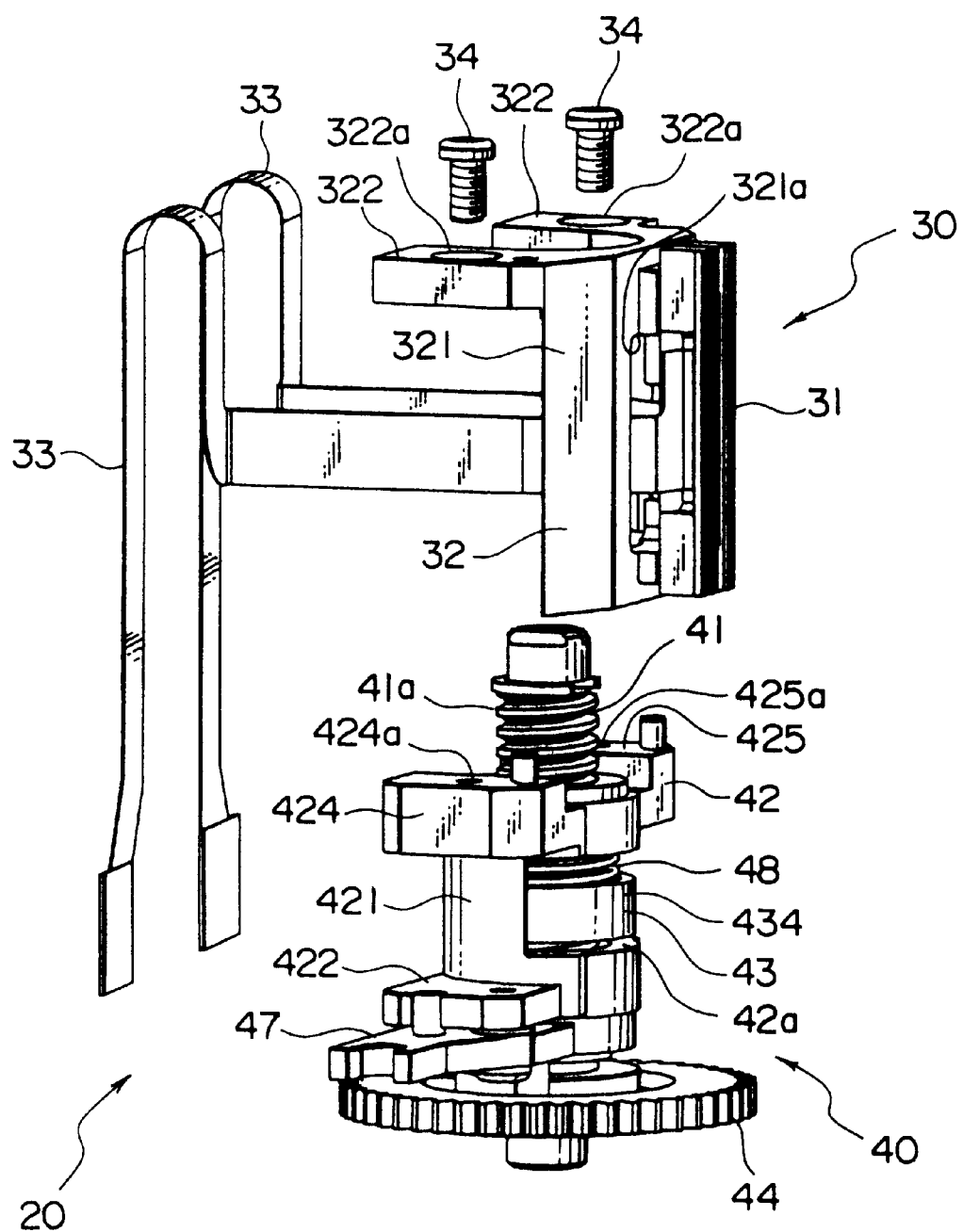
FIG. 8 is an exploded perspective view in which the magnetic tape head actuator assembly shown in FIG. 7 has been separated into a tape head assembly and a head sending mechanism.
Figure 9:
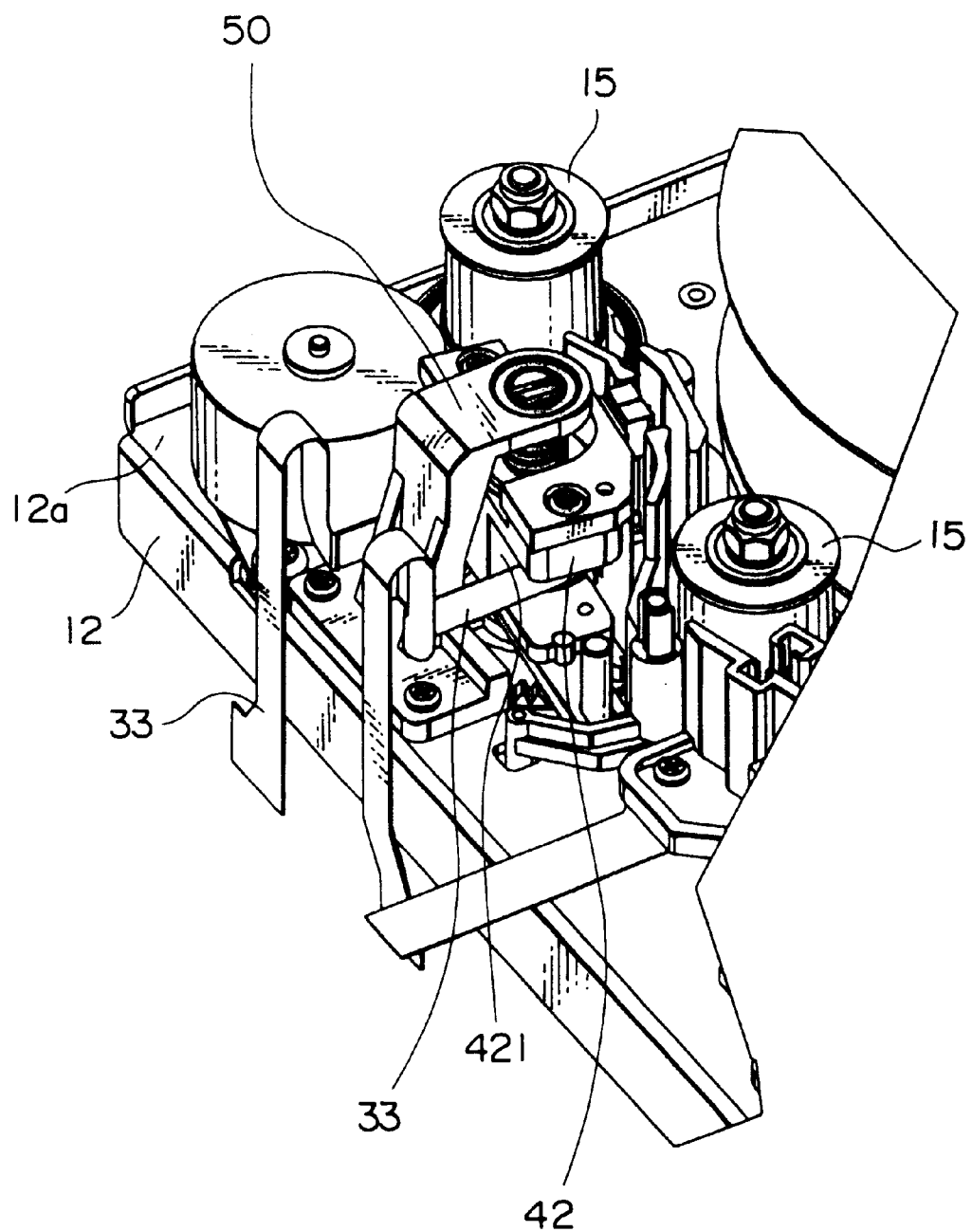
FIG. 9 is a perspective view partially showing the magnetic tape head actuator assembly shown in FIG. 7, as well as a bearing holder.
Figure 10:
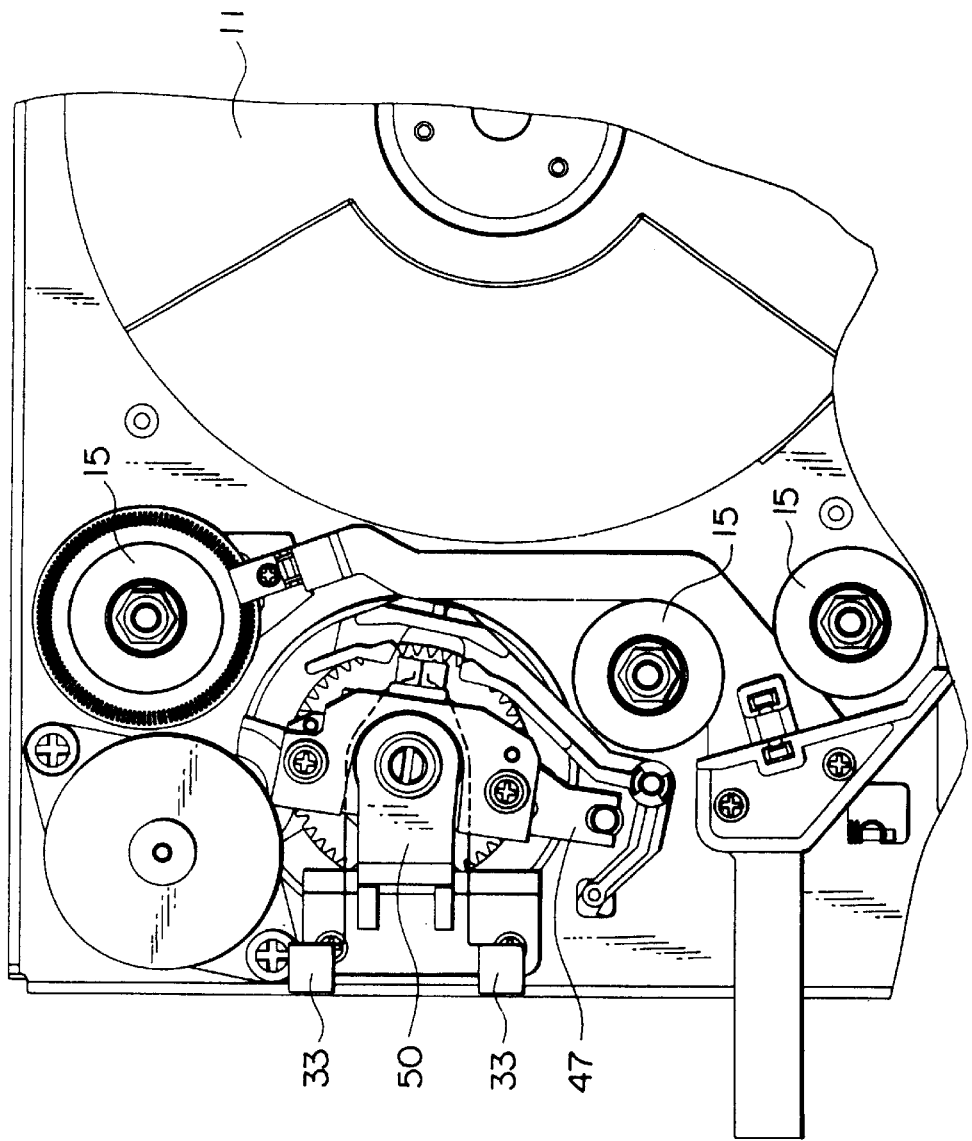
FIG. 10 is an enlarged plan view illustrating the magnetic tape head actuator assembly shown in FIG. 6.

In the following, FIGS. 7 to 10 will be used to explain a first embodiment of the magnetic tape head actuator assembly 20 formed according to this invention. In detail, FIG. 7 is a perspective view showing an outer appearance of the magnetic tape head actuator assembly 20. FIG. 8 is an exploded perspective view in which the magnetic tape head actuator assembly 20 shown in FIG. 7 has been separated into a tape head assembly 30 and a head sending mechanism 40. FIG. 9 is a perspective view partially showing the magnetic tape head actuator assembly 20 shown in FIG. 7, as well as a bearing holder. FIG. 10 is an enlarged plan view illustrating the magnetic tape head actuator assembly 20 shown in FIG. 6.

As shown in FIG. 8, the magnetic tape head actuator assembly 20 comprises the tape head assembly (hereinafter, simply referred to as head assembly) 30 and the head sending mechanism 40. The tape head assembly 30 has a magnetic head (head) 31 arranged in the vertical direction, a head holder 32 holding the magnetic head 31, as well as a pair of flexible print circuits (FPC) 33 which are provided for effecting an electric connection between the magnetic head 31 and an external circuit (not shown).

The head holder 32 comprises a head holding portion 321 for holding the magnetic head 31, a pair of mutually opposed flange portions 322 each protruding from an upper end of the head holding portion 321 and extending in a direction perpendicular to the head holding portion 321. Each flange portion 322 has a hole 322a for receiving a screw 34. By engaging the screws 34 in the holes 322a, the tape head assembly 30 and the head sending mechanism 40 (which will be described in more detail later in the present specification) may be installed in predetermined positions. Further, the head holding portion 321 has an opening 321a formed in substantially the center thereof. By way of the opening 321a, one end of each of the flexible print circuits (FPC) 33 is allowed to be electrically connected with the magnetic head 31.

On the other hand, the head sending mechanism 40 comprises a lead screw 41 which is in fact a shaft having formed thereon a plurality of screw threads 41a, a head lift 42, a pre-pressing bush 43, a lead screw gear 44, and a head guide 47.

The lead screw 41 has a rotational center axis O extending in the vertical direction. The head lift 42 is provided to hold the tape head assembly 30 and move the tape head assembly 30 in the vertical direction. Further, the head lift 42 has a hollow central portion, with half of its cylindrical portion being formed into an opening (hereinafter, referred to as "hollow opening"), thereby forming a generally I-shaped opening 42a. The pre-pressing bush 43 is disposed in the hollow opening 42a of the head lift 42, and has a plurality of screw grooves (not shown) engageable with the lead screw 41. The lead screw gear 44 is attached at the lower end of the lead screw 41 and can be driven by other driving means to rotate the lead screw 41 about its rotational center axis O. The head guide 47 is connected with the head lift 42 and has a plurality of screw grooves (not shown) engageable with the lead screw 41. In fact, the head guide 47 can cooperate with the pre-pressing bush 43, thereby causing the head lift 42 to move in the extending direction (the vertical direction) of the rotational center axis O, corresponding to the rotation of the lead screw 41 about the rotational center axis O.

Further, the head lift 42 is formed with a through hole (not shown) for the lead screw 41 to pass therethrough. In detail, the head lift 42 comprises a cylindrical portion 421 having the hollow opening 42a for receiving the pre-pressing bush 43, also comprises a pair of foot members 422 (only one of them is shown in the drawing) extending outwardly from the lower end of the cylindrical portion 421, a pair of arm members 424, 425 extending outwardly from the upper end of the cylindrical portion 421. Here, each of the lower end and the upper end of the cylindrical portion 421 is formed with a circular opening (not shown). A hollow head portion (not shown) of the head guide 47 and a slipping bearing (not shown) of the lead screw 41 are disposed in these circular openings. The above screw grooves are formed on the hollow head portion. Further, on the upper surfaces of the pair of arm members 424, 425, there are formed screw holes 424a and 425a engageable with the screw 34.

The pre-pressing bush 43 comprises a cylindrical portion (not shown) formed with the aforementioned screw grooves, an annular receiving portion (not shown) extending along the outer circumference of the cylindrical portion around lower end thereof, and a semi-cylindrical portion 434 extending upwardly from a portion corresponding to an approximate semi-circular portion along the outer circumference of the receiving portion. Further, a semi-circular groove (not shown) is formed between the cylindrical portion and the semi-cylindrical portion 434. A pre-pressing spring 48 is disposed within the semi-circular groove in a compressed state so that it can be completely inserted therein, thereby allowing the spring to be interposed between the pre-pressing bush 43 and the lower surface of the upper end portion of the head lift 42. Here, the pre-pressing spring 48 is in fact a compressive coil spring. Namely, by virtue of the pre-pressing spring 48, there is a downward pressing force constantly acting on the pre-pressing bush 43 along the rotational center axis O of the lead screw 41. Meanwhile, there is an upward pressing force constantly acting on the head lift 42, also along the rotational center axis O of the lead screw 41. At this time, since the head guide 47 is in connection with the head lift 42, there will also be an upward pressing force constantly acting on the head guide 47, along the rotational center axis O of the lead screw 41.

Here, the pre-pressing bush 43 and the pre-pressing spring 48 together serve as a backlash preventing mechanism for preventing an undesired backlash of the actuator assembly 20.

Figure 1:
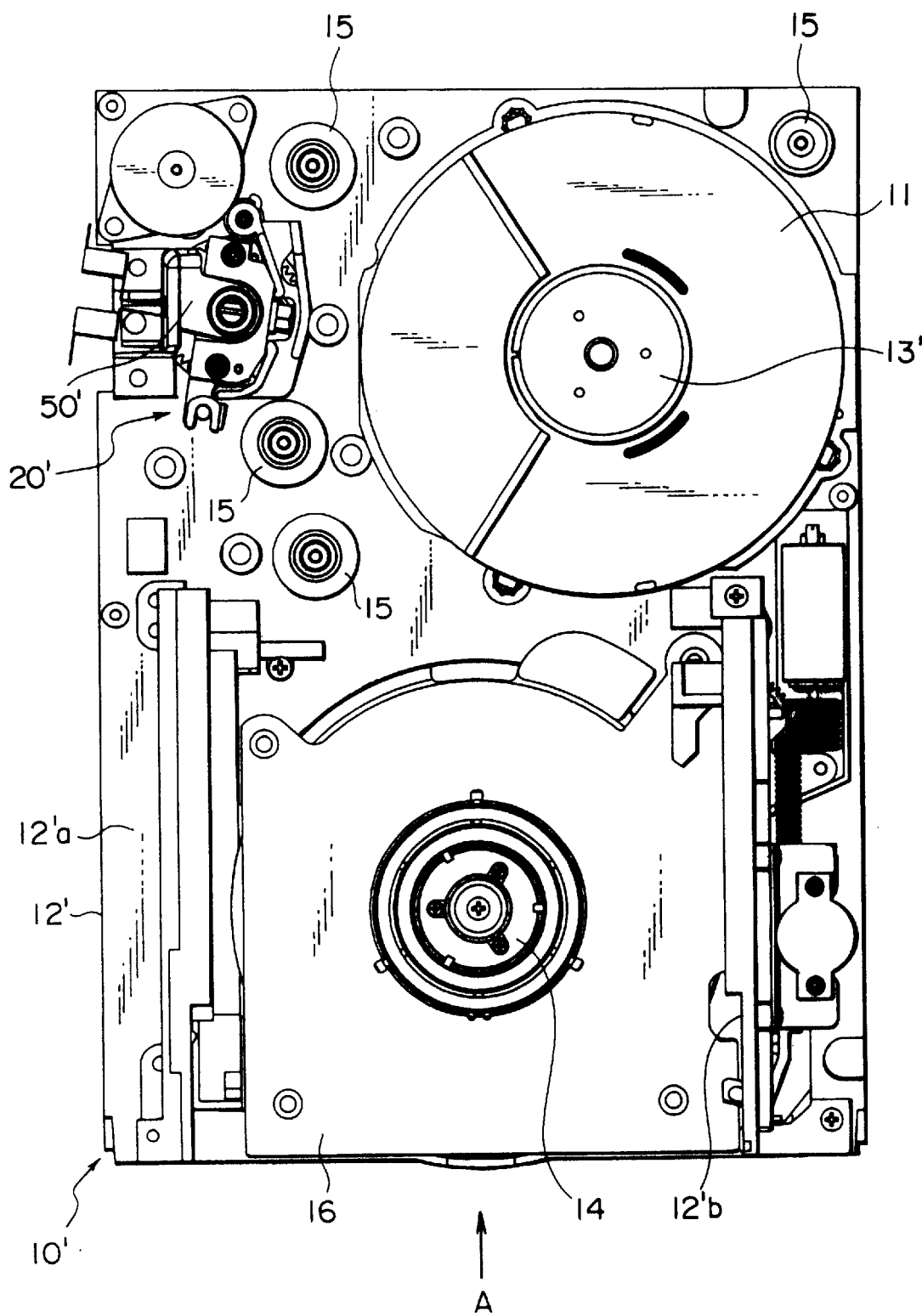
FIG. 1 is a plan view showing a conventional tape drive containing a conventional magnetic tape head actuator assembly, with its top cover taken away for clear illustration.
Figure 2:
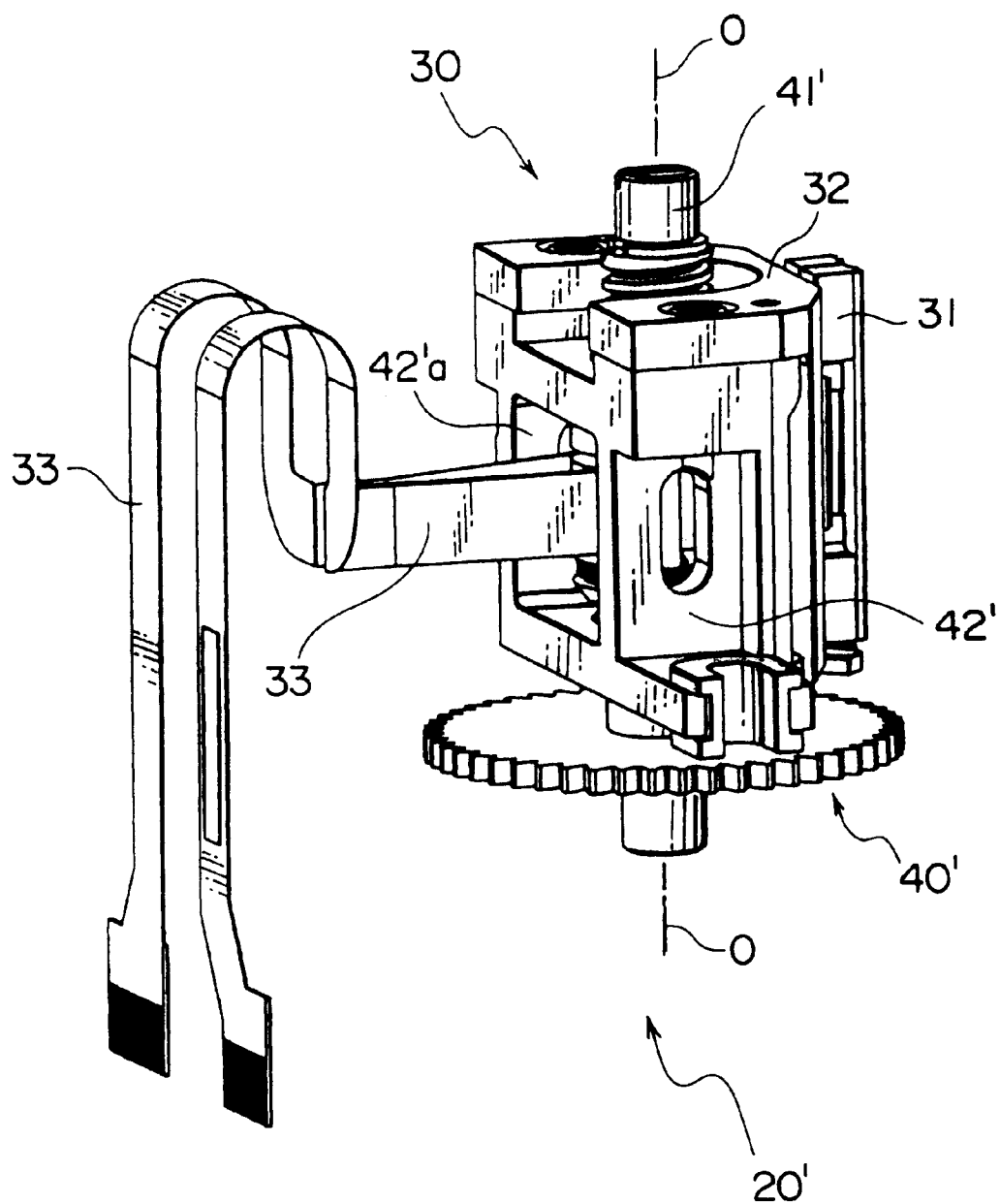
FIG. 2 is a perspective view showing an outer appearance of the conventional magnetic tape head actuator assembly.
Figure 3:
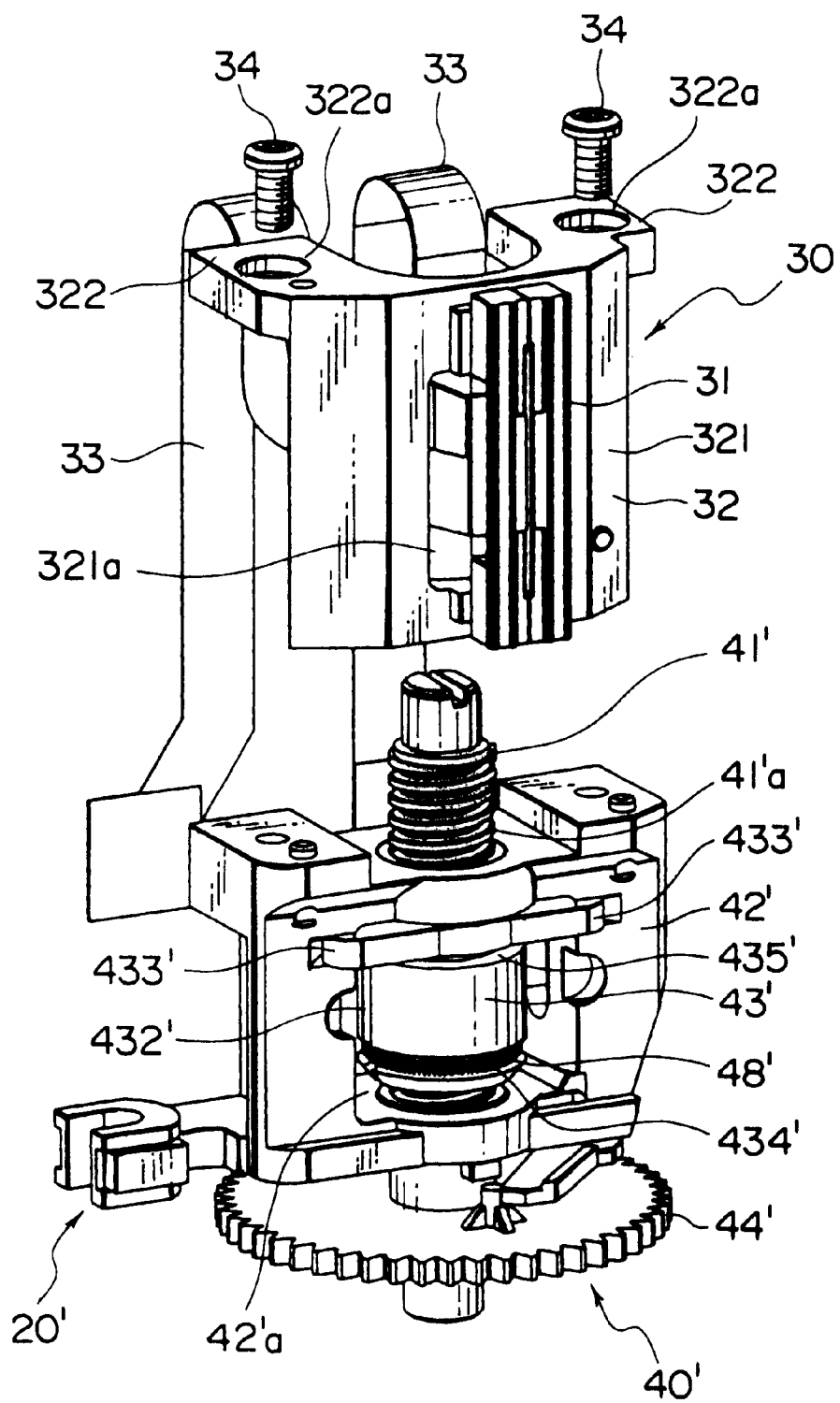
FIG. 3 is an exploded perspective view in which the magnetic tape head actuator assembly shown in FIG. 2 has been separated into a tape head assembly and a head sending mechanism.
Figure 4:
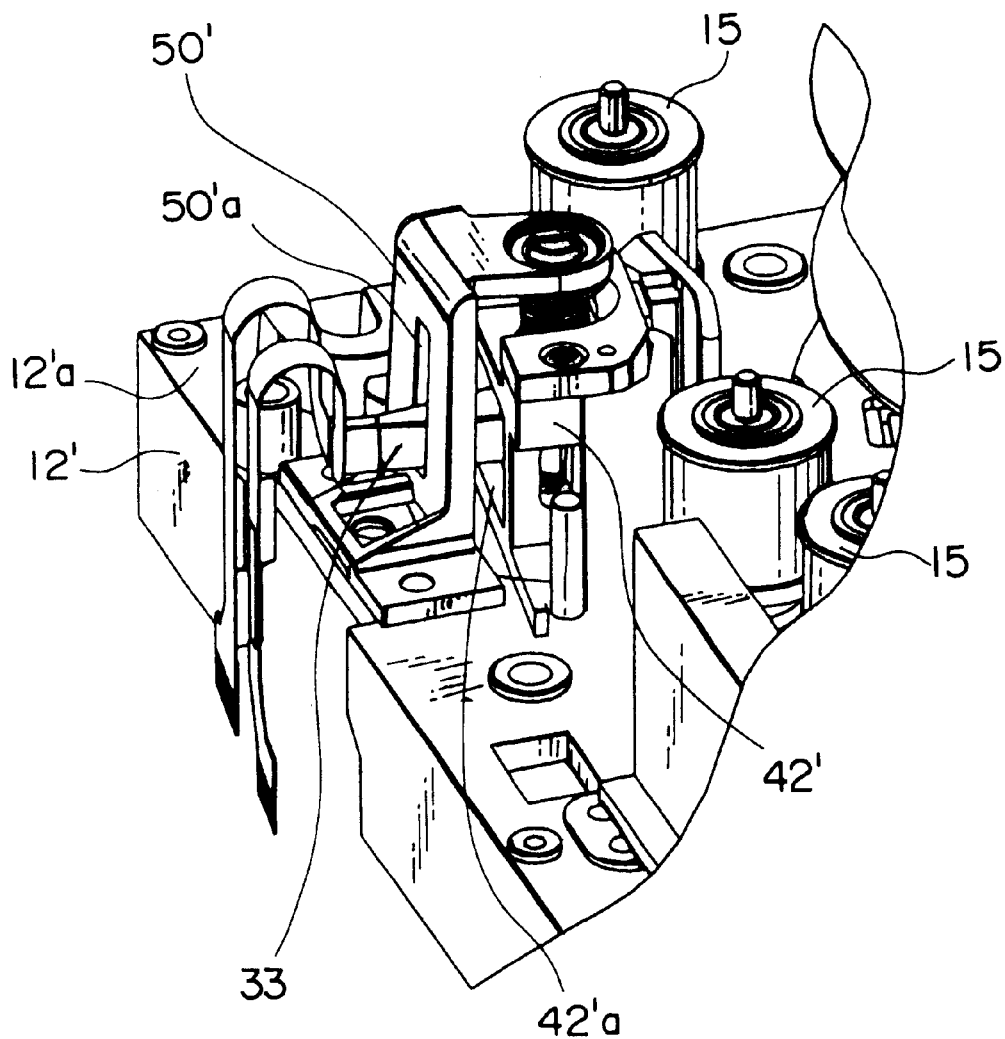
FIG. 4 is a perspective view partially showing the magnetic tape head actuator assembly shown in FIG. 2, as well as a bearing holder.
Figure 5:
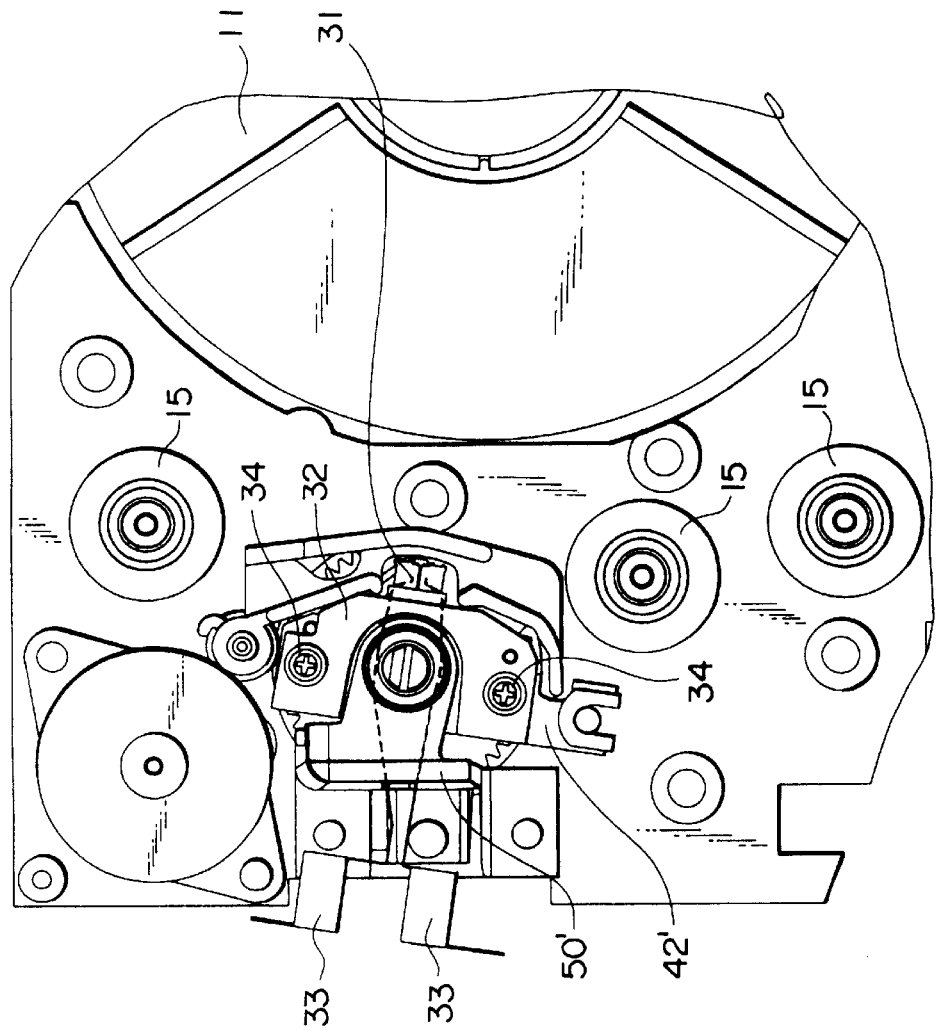
FIG. 5 is an enlarged plan view illustrating the magnetic tape head actuator assembly shown in FIG. 1.

As shown in FIG. 9, the actuator assembly 20 (head sending mechanism 40) is vertically kept on the base 12a of the chassis 12, by virtue of the bearing holder 50. However, such a bearing holder 50 is not formed with a through hole like a through hole 50'a in the aforementioned conventional bearing holder 50' (see FIG. 4).

As shown in FIG. 9 and FIG. 10, a pair of flexible print circuits (FPC) 33 are caused to extend from the magnetic head 31 through the opening 321a of the head holding portion 321, and the cylindrical portion 421 of the head lift 42, as well as the bearing holder 50. Namely, the lead screw 41 and the backlash preventing mechanism are disposed within the hollow opening 42a of the central cylindrical portion 421 of the head lift 42. The pair of flexible print circuits (FPC) 33 are arranged on the outside of the cylindrical portion 421 so as to wind around the cylindrical portion 421 of the head lift 42. In this way, it is not necessary to cause the pair of flexible print circuits (FPC) 33 to extend through the opening 42'a of the head lift 42', which would otherwise be necessary in the aforementioned conventional actuator assembly 20'. Further, as to the bearing holder 50, if support posts are all concentrated in the central portion, it is not necessary to cause the pair of flexible print circuits (FPC) 33 to extend through the hole 50'a, which would otherwise be necessary in the aforementioned conventional bearing holder 50'.

Although this invention has been described in the above by reference to a preferred embodiment, this invention should not be limited to such an embodiment. For example, although it has been described in the above embodiment that the head guide is fixedly attached to the head lift by virtue of screw fixation, it is of course possible to use other attachment method using (for example) a pressure insertion.

As may be understood from the above description, according to this invention, since the head lift comprises a cylindrical portion having a hollow opening in the central portion thereof, and since the pair of flexible print circuits are arranged as winding around the cylindrical portion of the head lift, it is not necessary to cause the pair of flexible print circuits to extend through the opening of the head lift.

Further, as to the bearing holder capable of vertically holding the actuator assembly on the chassis, if support posts are all concentrated in the central portion, it is also not necessary to cause the pair of flexible print circuits to extend through the aforementioned through hole. Therefore, it has become easy to perform an operation for assembling or disassembling the actuator assembly, and it is sure to avoid any possible damage to the pair of flexible print circuits (FPC) when they are attached to or detached from the chassis.

In addition, it has also become possible to reduce an amount of man-hours for the maintenance of the actuator assembly, which maintenance is usually performed, for example, to replace a used magnetic head (tape head assembly) with a new one.

What is claimed is:
1. An actuator assembly comprising:

a head assembly; and a head sending mechanism for moving said head assembly vertically along an axial direction;

wherein said head assembly comprises a magnetic head extending in the vertical direction, a head holder for holding the magnetic head and having an opening formed in a substantially central position thereof, and a pair of flexible print circuits extending through the opening of the head holder for connecting electrically between the magnetic head and an external circuit;

wherein said head sending mechanism comprises a lead screw having a plurality of screw threads and having a rotational axis extending in an axial direction thereof, and a head lift mounting the head assembly and having a through hole allowing the lead screw to extend therethrough;

wherein the head lift comprises a cylindrical portion having a hollow opening formed in a center portion thereof;

wherein the pair of flexible print circuits are arranged in a manner such that said cylindrical portion is wound by the flexible print circuits;

wherein said head sending mechanism further comprises:
a head guide which is attached to the head lift and which is formed with a plurality of screw grooves engageable with the lead screw, so that said head guide can move the head lift in the vertical direction along the rotational axis of the lead screw, corresponding to rotation of the lead screw; and
a backlash preventing mechanism arranged in the hollow opening of the cylindrical portion of the head lift for pressing the head lift in one direction along the rotational center axis of the lead screw; and wherein said backlash preventing mechanism comprises:
a pre-pressing bush disposed within the hollow opening of the cylindrical portion of the head lift and having a plurality of screw grooves engageable with the lead screw; and
a compressing coil spring disposed within the hollow opening of the cylindrical portion of the head lift, between the pre-pressing bush and the head lift, for providing a pressing force which presses the head lift in the axial direction of the lead screw.

2. An actuator assembly as claimed in claim 1, wherein the actuator assembly is kept vertical on a chassis by a bearing holder, and the pair of flexible print circuits extend out through one side of the bearing holder.

* * * * *